(12) United States Patent
Grimes

(10) Patent No.: US 10,929,913 B2
(45) Date of Patent: Feb. 23, 2021

(54) SYSTEMS, METHODS, AND COMPUTER PROGRAM PRODUCTS FOR INTELLIGENTLY PROCESSING AND MANIPULATING A SUBJECT IMAGE ACCORDING TO CONSUMER DATA

(71) Applicant: United Parcel Service of America, Inc., Atlanta, GA (US)

(72) Inventor: Jessica Grimes, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 652 days.

(21) Appl. No.: 15/647,721

(22) Filed: Jul. 12, 2017

(65) Prior Publication Data
US 2018/0018729 A1   Jan. 18, 2018

Related U.S. Application Data

(60) Provisional application No. 62/361,175, filed on Jul. 12, 2016.

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0631* (2013.01); *G06Q 30/0255* (2013.01); *G06Q 30/0261* (2013.01); *G06Q 30/0643* (2013.01)

(58) Field of Classification Search
CPC ................................................ G06Q 30/0631
See application file for complete search history.

(56) References Cited

U.S. PATENT DOCUMENTS 4,885,844 A   12/1989  Chun
6,101,484 A    8/2000  Halbert et al.
(Continued)

FOREIGN PATENT DOCUMENTS

WO         00/51050 A1    8/2000

OTHER PUBLICATIONS

Melnik, Mikhail, and Paul Richardson. "The impact of shipping charges in online auctions: Evidence from electronics auctions on eBay." The BRC Academy Journal of Business 1.1 (2010): 81-106.*

(Continued)

*Primary Examiner* — Kathleen Palavecino
(74) *Attorney, Agent, or Firm* — Shook, Hardy & Bacon L.L.P.

(57) ABSTRACT

A system, method and computer program product are provided for processing a subject image, consumer data, and product images to generate product recommendations. Subject images may be provided by consumers and may include products they wish to buy, and/or images of themselves to be utilized as an avatar. The subject image, and other images provided by other consumers may be processed to determine image characteristics, and correlations with consumer data including preferences, demographics, style preferences, physical characteristics, and/or the like. Trends, styles, and preferences may be intelligently learned such that relevant products are provided to a consumer. The subject image may be manipulated, such as by dressing an avatar in a recommended clothing article, and/or the like.

23 Claims, 10 Drawing Sheets

(56) References Cited

U.S. PATENT DOCUMENTS

| | | | |
|---|---|---|---|
| 6,269,343 | B1 | 7/2001 | Pallakoff |
| 8,306,870 | B2 | 11/2012 | Mesaros |
| 8,370,187 | B2 | 2/2013 | Hilbush et al. |
| 8,655,053 | B1 | 2/2014 | Hansen |
| 8,738,630 | B2 | 5/2014 | Lin |
| 9,043,212 | B2 | 5/2015 | Moore et al. |
| 9,047,607 | B1 | 6/2015 | Curial et al. |
| 9,430,777 | B1 | 8/2016 | Strand |
| 9,454,728 | B1 | 9/2016 | Bender et al. |
| 2007/0163841 | A1 | 7/2007 | Hatcher et al. |
| 2009/0216549 | A1 | 8/2009 | Causey et al. |
| 2009/0245500 | A1 | 10/2009 | Wampler |
| 2009/0319388 | A1 | 12/2009 | Yuan et al. |
| 2010/0070384 | A1 | 3/2010 | Kruusmaa et al. |
| 2010/0228628 | A1 | 9/2010 | Dufour |
| 2011/0082735 | A1* | 4/2011 | Kannan ............... G06Q 30/0222 705/14.23 |
| 2012/0086783 | A1 | 4/2012 | Sareen |
| 2012/0284148 | A1 | 11/2012 | Volchek |
| 2013/0006779 | A1 | 1/2013 | Belluomini |
| 2013/0173417 | A1 | 7/2013 | Spremulli |
| 2013/0211891 | A1 | 8/2013 | Daniel et al. |
| 2013/0212036 | A1 | 8/2013 | Klingenberg et al. |
| 2013/0219434 | A1 | 8/2013 | Farrell et al. |
| 2013/0275328 | A1* | 10/2013 | Klingenberg .......... G06Q 10/08 705/337 |
| 2014/0059126 | A1 | 2/2014 | Klemm et al. |
| 2014/0089099 | A1* | 3/2014 | Money ................... G06F 3/0485 705/14.66 |
| 2014/0176565 | A1* | 6/2014 | Adeyoola ............. G06T 19/006 345/473 |
| 2014/0180959 | A1 | 6/2014 | Gillen et al. |
| 2014/0303778 | A1 | 10/2014 | Shuster et al. |
| 2014/0351265 | A1 | 11/2014 | Beaurepaire et al. |
| 2015/0022522 | A1 | 1/2015 | Li et al. |
| 2015/0066700 | A1 | 3/2015 | Boss et al. |
| 2015/0066798 | A1 | 3/2015 | Gillen et al. |
| 2015/0081587 | A1 | 3/2015 | Gillen |
| 2015/0161556 | A1 | 6/2015 | Jena |
| 2015/0241209 | A1 | 8/2015 | Jouper et al. |
| 2015/0254751 | A1 | 9/2015 | Torres |
| 2015/0262125 | A1 | 9/2015 | Sager et al. |
| 2015/0324103 | A1 | 11/2015 | Tepmongkol et al. |
| 2016/0253738 | A1* | 9/2016 | Pinckney ................. G06N 5/04 705/26.7 |
| 2016/0350799 | A1 | 12/2016 | Johnson |

OTHER PUBLICATIONS

What's Package Consolidation | How Can It Reduce Shipping Costs?, Benefits of Package Consolidation, Sep. 10, 2012, MYUS, MyUS.com, 3 pages, https://www.myus.com/blog/whatispackageconsolidationreduceshippingcosts/, Mar. 13, 2017.

UPS Launches Chatbot and Accelerates on Path Toward Use of Artificial Intelligence, Nov. 21, 2016, Kyle Peterson, GlobeNewswire, 3 pages, https://globenewswire.com/newsrelease/2016/11/21/891721/0/en/UPSLaunchesChatbotAndAcceleratesOnPathTowardUseOfArtificialIntelligence. html, Mar. 14, 2017.

TV Wall Mounting Service Amazon, 4 pages, https://www.amazon.com/gp/product/B00QI7YA9G/?vas=%7B'area%3A'33173'%2C'czc'%3A1%2C%20'showOLP'%3A0%2C%20'productASIN'%3A'"%7D, Oct. 11, 2017.

The Marketplace Concept—Home | Facebook, Facebook, 4 pages, https://www.facebook.com/TheMarketplaceConcept, Oct. 11, 2017.

Targeted Marketing, Streaming for Apparel Brands and Retailers, The Tailored App, Tailored LLC, 6 pages, http://www.tailoredapp.co/streaming/, Mar. 14, 2017.

Supporting a Project, Crowd Supply Guide, 3 pages, https://www.crowdsupply.com/guide/supportingprojects, Mar. 13, 2017.

Slyce Lets Users Instantly Identify and Purchase Items Using Smartphones, Mar. 14, 2014, Ivor Tossell, The Globe and Mail, 7 pages.

Set Shipping Costs with Shipping Profiles, ETSY, Apr. 23, 2011 to Sep. 18, 2015, Internet Archive, 5 pages, https://web.archive.org/web/20140101000000*/https://www.etsy.com/help/article/190, Oct. 11, 2017.

Save Tweets Featuring Specific Content to a Google Spreadsheet, Sep. 7, 2011, IFTTT, https:ifttt.com/applets/P45PCZKW-save-tweets-featuring-specific-content-to-a-spreadsheet.

Real-Time, Automatic Shape-Changing Robot Adjustment and Gender Classification, SIViP (Signal, Image, and Video Processing), Jul. 31, 2015, Daneshmand, Morteza, et al., CrossMark, Springer, pp. 753-760, 10.

Qvit, Try Clothes on Your Custom Replica when Shopping Online, Aug. 18, 2013, QVIT, Internet Archive, 1 page, http://web.archive.org/web/20130818102102/http:/www.qvit.com/main/.

No Name Brand ACRYLO, Brennan Letkeman, 6 pages, http://www.brennanletkeman.com/blog/2011/no-name-brand/, Mar. 13, 2017.

NFL Shop, NFL, Feb. 29, 2000 to Oct. 11, 2017, Internet Archive, Oct. 11, 2017, 7 pages, https://web.archive.org/webr/http://www.nflshop.com.

Meet Pictofit, Your Virtual Filling Room App., PICTOFiT, 2 pages, http://www.pictofit.com/, Mar. 14, 2017.

Machine Fashion: An Artificial Intelligence Based Clothing Fashion Stylist, Master of Science Degree Thesis, Aug. 1, 2014, Haosha Wang, The University of Georgia, 66 pages, https://www.ai.uga.edu/sites/default/files/theses/wang_haosha.pdf, Aug. 25, 2017.

Introducing ShipStation's newest time saving feature—Shipping Presets, Shipstation, Aug. 3, 2012, Bryon (Blogger), 5 pages, http://www.shipstation.com/blog/inking-new-ideas/introducing-shipstations-newest-time-saving-feature-shipping-presets/, Oct. 11, 2017.

How to Offer Free Shipping without Going Broke, Apr. 10, 2012, Stephen Bulger, Practical Ecommerce, 7 pages, http://www.practicalecommerce.com/articles/99189bulgerfreeshipping, Mar. 15, 2017.

How to Create a Shipping Profile, Auctiva, Jul. 28, 2009 to Apr. 12, 2017, Internet Archive, 11 pages, https://web.archive.org/webr/http://www.auctiva.com/help/tutorial.aspx?id=shipping-profile, Oct. 11, 2017.

How does Massdrop work? ? Massdrop Help Center, Massdrop, 2 pages, https://helpdesk.massdrop.com/hc/enus/articles/213150347MassdropReturnPolicy, Mar. 15, 2017.

How do I set defaults / profiles in WorldShip for common shipping tasks?, UPS, Sep. 26, 2009 to May 3, 2017, Internet Archive, 6 pages, https://web.archive.org/web/20090926060634/https://www.ups.com/content/us/en/resources/sri/worl12.html, Oct. 11, 2017.

How Consolidation of Packages Works, Shipito, 4 pages, https://www.shipito.com/en/help/tutorials/consolidation#mps, Mar. 13, 2017.

How Artificial Intelligence is Transforming Enterprise Customer Service, Feb. 27, 2017, Adelyn Zhou, Forbes, 17 pages, https://www.forbes.com/sites/adelynzhou/2017/02/27/howartificialintelligenceistransformingenterprisecustomerservice/#7123b4431483, Mar. 14, 2017.

From 2D Photos of Yourself to Virtual Try-On Dress on the Web, People and Computers XV?Interaction without Frontiers, Aug. 27, 2001, Cordier, F., et al., Springer-Verlag London Limited, pp. 31-46.

Free Shipping ? Why it Matters and How You Can Offer It, Nov. 29, 2016, Priya Nair, CommerceHub, 10 pages, https://www.commercehub.com/whyfreeshippingmattershowtoofferit/, Mar. 15, 2017.

Fitle: The Smartshopping Experience, May 1, 2012, FITLE, Kickstarter, 16 pages, https://www.kickstarter.com/projects/762163326/fitle-the-smartshopping . . . , Mar. 7, 2017.

Fighting Amazon's Supply Chain Takeover, Nov. 4, 2016, Michael Bentley, Supply Chain Management Review, 4 pages, http://www.scmr.com/article/fighting_amazons_supply_chain_takeover, Mar. 15, 2017.

FedEx Bets on Automation as It Prepares to Fend Off Uber and Amazon, Feb. 3, 2017, Elizabeth Woyke, MIT Technology Review, 10 pages, https://www.technologyreview.com/s/602896/fedexbetsonautomationasitpreparestofendoffuberandamazon/, Mar. 14, 2017.

Facebook Tests "Local Market," A Dedicated Buying and Selling Community Powered by Facebook Groups, Oct. 29, 2015, Sarah Perez, TechCrunch, 12 pages, https://techcrunch.com/2015/10/29/facebooktestslocalmarketadedicatedbuyingandsellingcommunitypoweredbyfacebookgroups/, Mar. 9, 2017.

(56) References Cited

OTHER PUBLICATIONS

Everything you need to know about receiving funds on eBay, eBay, Inc., Oct. 31, 2016 to Aug. 11, 2017, Internet Archive, 7 pages, https://web.archive.org/web/*/https://pages.ebay.com/seller-center/payments-and-fees/funds-availability.html, Oct. 11, 2017.

Dressing without Guessing (Copyright 2013), My Shape Stylist, No Place Like Holm Ltd, 7 pages, http://www.myshapestylist.com/, Mar. 10, 2017.

Chloe, Artificial Intelligence to Make Your Business Smarter, Feb. 27, 2016, SUNDOWN ai, 6 pages, https://www.sundown.ai/home/.

Chirpify Drops Its "Hashtag Commerce" Consumer Marketplace to Focus on Big Brand Marketing and "Actiontags", Sep. 19, 2013, Rip Empson, TechCrunch, 7 pages.

Build Conversation Bots, Amazon Web Services, Inc., Amazon Lex, 9 pages, https://aws.amazon.com/lex/, Mar. 14, 2017.

Azure Bot Service, Intelligent, Serverless Bot Service that Scales on Demand, Microsoft, https://azure.microsoft.com/en-us/services/bot-service/, Aug. 31, 2017.

Automation Rules and Best Practices, updated, Apr. 7, 2016, Twitter, https://support.twitter.com/articles/76915#, Aug. 31, 2017.

A Virtual Filling Room to Dress Up Your Avatar (Copyright 2013), Virtual Outfits, 2 pages, http://www.virtualoutfits.com/, Mar. 7, 2017.

5 Shipping Secrets of Zappos, Dec. 4, 2012, Carol Tice, 7, https://www.entrepreneur.com/article/225140, Mar. 13, 2017.

11 Examples of Conversational Commerce and Chatbots, May 31, 2016, Michael Quoc, Chatbots Magazine, 20 pages, https://chatbotsmagazine.com/11-examples-of-conversational-commerce-57bb8783d332, Aug. 25, 2017.

No Brand, Quality Goods' Retailer Muji to Open Store in Paramus, Jun. 29, 2016, Joan Verdon, North Jersey Media Group, 2 pages, http://archive.northjersey.com/news/business/njtogetitsfirstmuji1.1623297, Mar. 13, 2017.

* cited by examiner

SYSTEMS, METHODS, AND COMPUTER PROGRAM PRODUCTS FOR INTELLIGENTLY PROCESSING AND MANIPULATING A SUBJECT IMAGE ACCORDING TO CONSUMER DATA

CROSS-REFERENCE TO RELATED APPLICATIONS

This application claims priority to and the benefit of U.S. Provisional Patent Application Ser. No. 62/361,175, filed Jul. 12, 2016, entitled, "Methods, Apparatuses and Computer Program Products For Providing Buyer Centric Features," the entire contents of which as are hereby incorporated by reference in their entirety.

BACKGROUND

Consumers are increasing their expectations regarding enriched user interface experiences, image processing, and manipulation. This is particularly evident in the electronic marketplace, wherein the scope of products and services provided—in addition to how they are provided—are increasingly consumer-driven. In response, entities across multiple industries have adapted, so as to provide ever-improving degree of customization for consumers utilizing and/or interacting with various products and/or services. Customization initiatives to date, however, largely arise and operate in response to consumer demands; thus, making them reactive and thus delayed. Accordingly, new concepts are needed to proactively predict and thus enhance customer experience and loyalty by improving the efficiency, timeliness, and accuracy of user interface interactions.

BRIEF SUMMARY

A system is provided for processing a subject image, consumer data and product images to generate product recommendations, the system comprising at least one processor at least one memory device for storing (a) images received from consumers, (b) the consumer data relating to at least one of consumer preferences, consumer purchase history or consumer browsing history, and (c) the product images received from third parties. The at least one processor may be configured to receive the subject image associated with a subject consumer, perform electronic image processing of the subject image to determine at least one image characteristic therein, and identify a subset of images accessed from the stored images received from consumers, wherein the subset of images each comprise the at least one image characteristic.

The processor may be further configured to access a subset of the consumer data identified as being associated with the subset of images comprising the at least one image characteristic, determine data-image correlations between the consumer data and respective images of the subset of images comprising the at least one image characteristic, and generate image characteristics describing product images received from the third parties by electronic image processing, apply the determined data-image correlations to the generated image characteristics to identify particular consumer-relevant product images received from the third parties, and generate electronic instructions that automatically generate, in a consumer interface, the product recommendations for the subject consumer.

In some embodiments, the processor may be further configured to predictively adjust consumer data associated with the subject consumer based on correlations of other consumer data and respective associated images, wherein the product recommendations are further generated based on the predictively adjusted consumer data.

In certain embodiments, the processor is further configured to determine position data associated with the subject image, manipulate the subject image with at least one product image associated with at least one product recommendation, wherein the product image is incorporated into the subject image according to the determined position data, and cause provision of the manipulated subject image on a user computing entity.

In some embodiments, the processor may be further configured to, via the consumer interface, enable consumer directed manipulation of the subject image with at least one product image associated with at least one product recommendation.

The processor may be further configured to generate a natural language query to solicit additional information regarding preferences of the subject consumer, and process a received natural language response to generate consumer preferences, wherein the product recommendations are further based on the generated consumer preferences.

In some embodiments, the processor may be configured to predictively determine a shipping preference for a selected product recommendation based on at least one of the consumer data or the at least one image characteristic In some embodiments, the at least one memory device further stores (d) interaction data describing consumer interactions with electronic advertisements, and the processor is further configured to process the interaction data to determine a targeted advertisement for the subject consumer and the generated product recommendations.

In some embodiments, the subject image is received via an external consumer-facing third party system. In some embodiments, the subject image is received via the consumer interface communicatively connected to the system via at least one network.

A computer-implemented method is also provided for processing a subject image, consumer data and product images to generate product recommendations. The method may include receiving and storing within one or more memory storage areas of a system, (a) images received from consumers, (b) the consumer data relating to at least one of consumer preferences, consumer purchase history or consumer browsing history, and (c) the product images received from third parties. The method may further include receiving the subject image associated with a subject consumer, performing electronic image processing of the subject image to determine at least one image characteristic therein, identifying a subset of images accessed from the stored images received from consumers, wherein the subset of images each comprise the at least one image characteristic and accessing a subset of the consumer data identified as being associated with the subset of images comprising the at least one image characteristic.

The method may further include determining data-image correlations between the consumer data and respective images of the subset of images comprising the at least one image characteristic, generating image characteristics describing product images received from the third parties by electronic image processing, applying the determined data-image correlations to the generated image characteristics to identify particular consumer-relevant product images received from the third parties; and generating electronic instructions that automatically generate, in a consumer interface, the product recommendations for the subject consumer.

A computer program product is provided for processing a subject image, consumer data and product images to generate product recommendations, the computer program product comprising at least one non-transitory computer-readable storage medium having computer-readable program code portions embodied therein, the computer-readable program code portions comprising one or more executable portions configured for receiving and storing within one or more memory storage areas of a system, (a) images received from consumers, (b) the consumer data relating to at least one of consumer preferences, consumer purchase history or consumer browsing history, and (c) the product images received from third parties. The one or more executable portions may be further configured for receiving the subject image associated with a subject consumer, performing electronic image processing of the subject image to determine at least one image characteristic therein, identifying a subset of images accessed from the stored images received from consumers, wherein the subset of images each comprise the at least one image characteristic, accessing a subset of the consumer data identified as being associated with the subset of images comprising the at least one image characteristic, determining data-image correlations between the consumer data and respective images of the subset of images comprising the at least one image characteristic, generating image characteristics describing product images received from the third parties by electronic image processing, applying the determined data-image correlations to the generated image characteristics to identify particular consumer-relevant product images received from the third parties, and generating electronic instructions that automatically generate, in a consumer interface, the product recommendation for the subject consumer.

An apparatus is provided, with means for receiving and storing within one or more memory storage areas of a system, (a) images received from consumers, (b) the consumer data relating to at least one of consumer preferences, consumer purchase history or consumer browsing history, and (c) the product images received from third parties. The apparatus may further includes means for receiving the subject image associated with a subject consumer, means for performing electronic image processing of the subject image to determine at least one image characteristic therein, and means for identifying a subset of images accessed from the stored images received from consumers, wherein the subset of images each comprise the at least one image characteristic.

The apparatus may further include means for accessing a subset of the consumer data identified as being associated with the subset of images comprising the at least one image characteristic, means for determining data-image correlations between the consumer data and respective images of the subset of images comprising the at least one image characteristic, means for generating image characteristics describing product images received from the third parties by electronic image processing, means for applying the determined data-image correlations to the generated image characteristics to identify particular consumer-relevant product images received from the third parties, and means for generating electronic instructions that automatically generate, in a consumer interface, the product recommendation for the subject consumer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
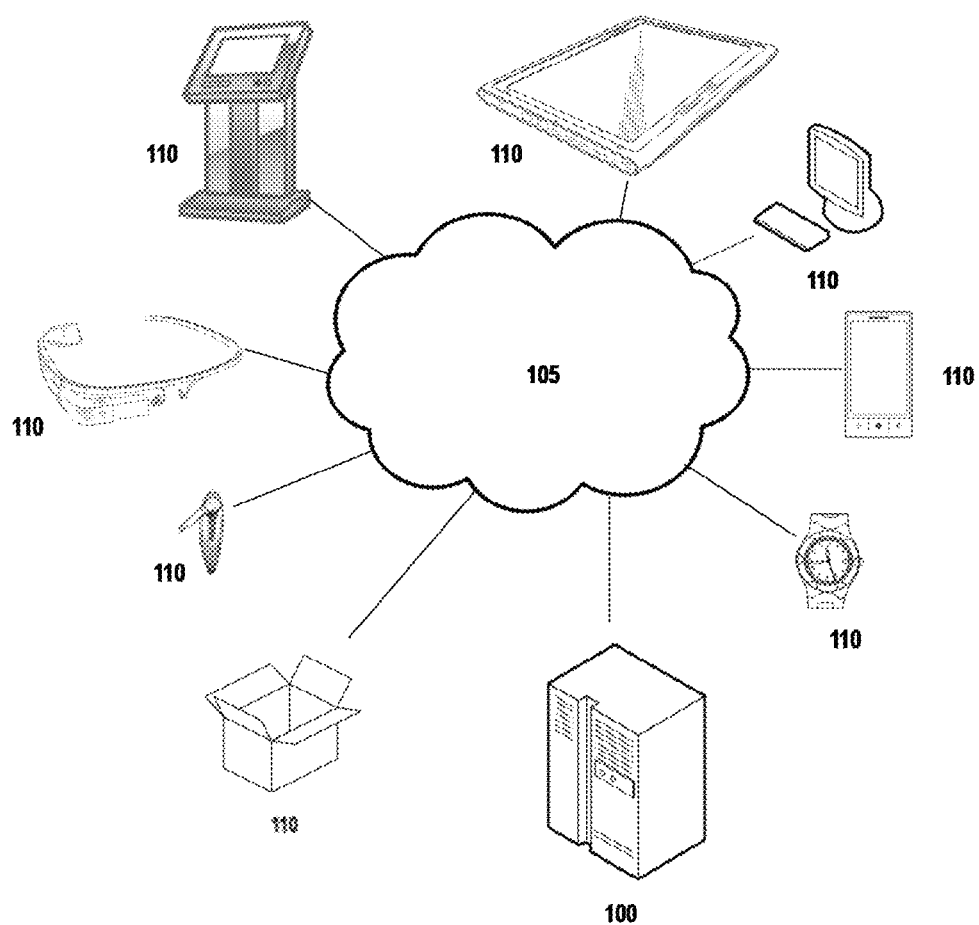
FIG. 1 is an overview of a system that can be used to practice various embodiments of the present disclosure.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of an exemplary embodiment of the present invention. As shown in FIG. 1, this particular embodiment may include one or more carrier computing entities or carrier system 100, one or more networks 105, and/or one or more user computing entities 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Carrier System

Figure 2:
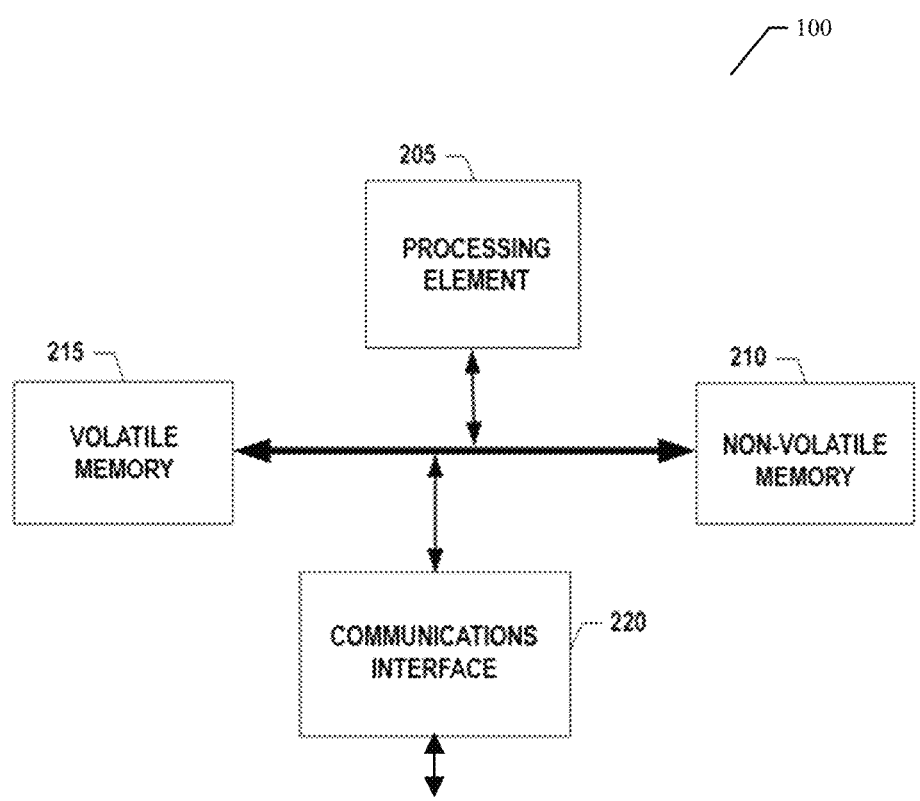
FIG. 2 is an exemplary schematic diagram of a computing entity according to various embodiments of the present disclosure.

FIG. 2 provides a schematic of a carrier system 100 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier system 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the carrier system 100 may include or be in communication with one or more processing elements 205 (also referred to as processors, processing circuitry, and/or similar terms used herein interchangeably) that communicate with other elements within the carrier system 100 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the carrier system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier system 100 with the assistance of the processing element 205 and operating system.

As indicated, in one embodiment, the carrier system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth® protocols, wireless universal serial bus (USB) protocols, and/or any other wireless protocol.

Although not shown, the carrier system 100 may include or be in communication with one or more input elements, such as a keyboard input, a mouse input, a touch screen/display input, motion input, movement input, audio input, pointing device input, joystick input, keypad input, and/or the like. The carrier system 100 may also include or be in communication with one or more output elements (not shown), such as audio output, video output, screen/display output, motion output, movement output, and/or the like.

In one embodiment, the carrier system 100 may include various payment features and functionalities. Payments (received or paid) may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through near field communications (NFC) technologies such as PayPass, Android Beam, Bluetooth® low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like.

As will be appreciated, one or more of the carrier computing entity's 100 components may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances. As will be recognized, these architectures and descriptions are provided for exemplary purposes only and are not limiting to the various embodiments.

2. Exemplary User Computing Entities

Figure 3:
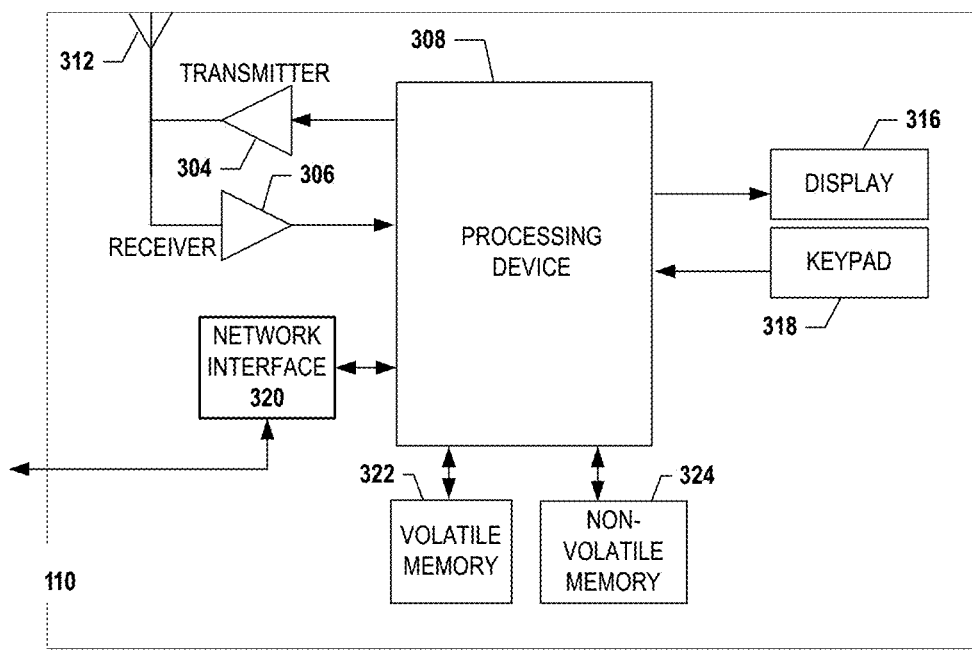
FIG. 3 is an exemplary schematic diagram of a computing entity according to various embodiments of the present disclosure.

A user or consumer may be an individual, a family, a company, an organization, an entity, a department within an organization, a representative of an organization and/or person, and/or the like—whether or not associated with a carrier. To do so, a user may operate a user computing entity 110 that may include one or more components that are functionally similar to those of the carrier system 100. FIG. 3 provides an illustrative schematic representative of a user computing entity 110 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties, including carrier personnel (sorters, loaders, delivery drivers, network administrators, and/or the like). As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, co-processing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier system 100. In a particular embodiment, the user computing entity 110 may operate in accordance with multiple wireless communication standards and protocols, such as UMTS, CDMA2000, 1xRTT, WCDMA, TD-SCDMA, LTE, E-UTRAN, EVDO, HSPA, HSDPA, Wi-Fi, Wi-Fi Direct, WiMAX, UWB, IR, NFC, Bluetooth®, USB, and/or the like. Similarly, the user computing entity 110 may operate in accordance with multiple wired communication standards and protocols, such as those described above with regard to the carrier system 100 via a network interface 320.

Via these communication standards and protocols, the user computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include location determining aspects, devices, modules, functionalities, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 110 position in connection with a variety of other systems, including cellular towers, Wi-Fi access points, and/or the like. Similarly, the user computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier system 100, as described herein. The user input interface can comprise any of a number of devices or interfaces allowing the user computing entity 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier system 100 and/or various other computing entities.

In another embodiment, the user computing entity 110 may include one or more components or functionality that are the same or similar to those of the carrier system 100, as described in greater detail above. As will be recognized, these architectures and descriptions are provided for exemplary purposes only and are not limiting to the various embodiments.

III. Exemplary System Operation

Figure 4:
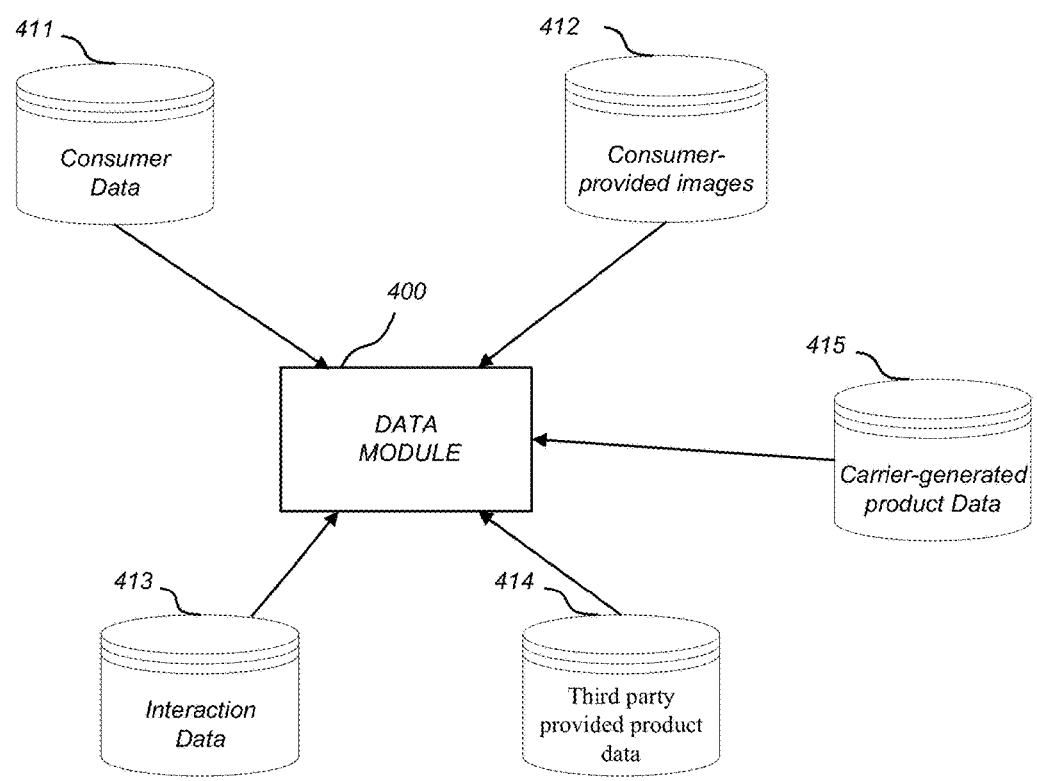
FIG. 4 illustrates a schematic diagram of various databases that are utilized according to various embodiments of the present disclosure.

Example embodiments are now provided with reference now to FIG. 4, which illustrates a block diagram of various exemplary databases via which a data module 400 manages a variety of data. Data module 400 may include any executable program code to perform various data management operations including but not limited to receiving, storing, managing, transmitting data, and/or generating a tangible or concrete thing/item or representation of a thing/item based upon the data received, stored, managed, and/or transmitted. In particular, in at least the embodiment shown in FIG. 4, the following databases and repositories are provided: a consumer database 411, a consumer-provided images repository 412, an interaction database 413, a third party provided product data repository 414 and/or a product database 415. Although the embodiment of FIG. 4 shows the entities 411-415 as separate databases and/or repositories each associated with different types of data, in various other embodiments, some or all of the data may be stored in the same database or repository. In still other embodiments, additional and/or alternative databases and repositories may be provided, as may also be desirable for particular applications. In some examples, the entities 411-415 may include or may be implemented on non-volatile memory 210 and/or volatile memory 215, for example.

In some embodiments, the consumer data stored on consumer database 411 may include any data relating to consumers, consumer preferences, and/or consumer purchase history. In this regard, the consumer data may be generated by carrier system 100, such as by monitoring a consumer's browsing history, compiling a consumer's purchase history, soliciting a consumer profile or preferences to be provided by a consumer, and/or the like. Additionally or alternatively, consumer data may be provided and/or generated by consumers and mined by the carrier system 100 via a back-end interface, for example. In some embodiments, the consumer data may be provided via a third party (such as but not limited to third parties that interface with the carrier system 100 to initiate shipments of their products).

The consumer data may describe demographics (e.g., age, gender, locale, and/or familial status), associated pets, hobbies, life events and/or the like. In some embodiments, consumer data may describe physical characteristics of a consumer, such as but not limited to body type, height, weight, inseam, leg length, skin tone (e.g., cool or warm), hair color, dominant body features, hairstyle, and/or the like. The consumer data may further include a style profile comprising data describing style preferences of the consumer.

Additionally or alternatively, the consumer data may comprise any data relating to product preferences or purchase trends of particular consumers including preferred price ranges, preferred price ranges relative to product type, product quality preferences, and/or the like. In some examples, a consumer may allow access by the carrier system 100 to purchase histories with a particular retailer or group of retailers.

The consumer data may include a unique identifier or other identifier to link the data to a particular consumer or group of consumers. For example, the consumer data may include login information used by the consumer to login to an interface of the carrier system 100. The unique identifier may additionally or alternatively include an account number, or random identifier associated with the consumer and/or an account number.

In some embodiments, the consumer-provided images stored on consumer-provided images repository 412 may include images provided to the carrier system 100 by consumers. For example, a consumer may take photographs of items that they wish to buy and provide them to the carrier system 100 (e.g., via a consumer interface), for processing and/or manipulation. The images may additionally or alternatively include photographs of the consumer for the purpose of using the image to generate an avatar of the consumer. The images may additionally or alternatively be provided via an external consumer-facing third party system, such as but not limited to via a social networking site. An image provided to the third party by the consumer may be tagged, for example, and subsequently accessed by or provided to the carrier system. As another example, images "liked" or "pinned" by a consumer or friend of a consumer may be accessed by the carrier system 100 for further processing as described below.

The consumer-provided images may have an associated unique identifier or other identifier to link images to a particular consumer or group of consumers.

According to some embodiments, interaction data stored on interaction database 413 may include any data generated by carrier system 100, or received by carrier system 100, such as from a third party, that describes past consumer interactions with advertisements, promotions, impressions and/or the like. For example, carrier system 100 may send promotional marketing emails to consumers, and/or may generate visual impressions to display on an interface, such as but not limited to an interface of the carrier system, or an interface of the third party, such as one accessed by the consumer to purchase products. The interaction data may describe past consumer interactions with the advertisements, promotions, and/or visual impressions. The interaction data may therefore indicate whether a consumer responded to a particular type of promotion or impression, and may indicate the likelihood of success of similar promotions in the future.

According to some embodiments, the third party provided product data stored by the third party provided product data repository 414 may comprise images of products a offered for sale, which may be shipped as directed by carrier system 100. The third party provided product data may be provided by a shipper, vendor, retailer, manufacturer, and/or the like entity having information and images of products offered for sale. The third party provided product data may further comprise data describing an associated product represented by an image, such as, but not limited to, price, color, color options, size, size options, shipping cost, product category, product description, product rating, and/or the like. The third party may therefore interface with the carrier system 100 to provide shipping instructions. The third party provided product data may be mined from websites or systems of the third party, and/or may be provided to the carrier system 100 by the third party and/or automatically collected from the websites and/or systems directly by the carrier system 100.

In some examples, data describing the third-party provided images may be generated by the carrier system 100 by performing electronic image processing and inferring image characteristics. The carrier system 100 may store such image characteristics as product data in the product database 415. In this regard, the product database 415 may comprise product data describing a product, which may be provided by the third party and/or generated by the carrier system 100 (such as, for example, by processing the third party provided images of products).

Figure 5:
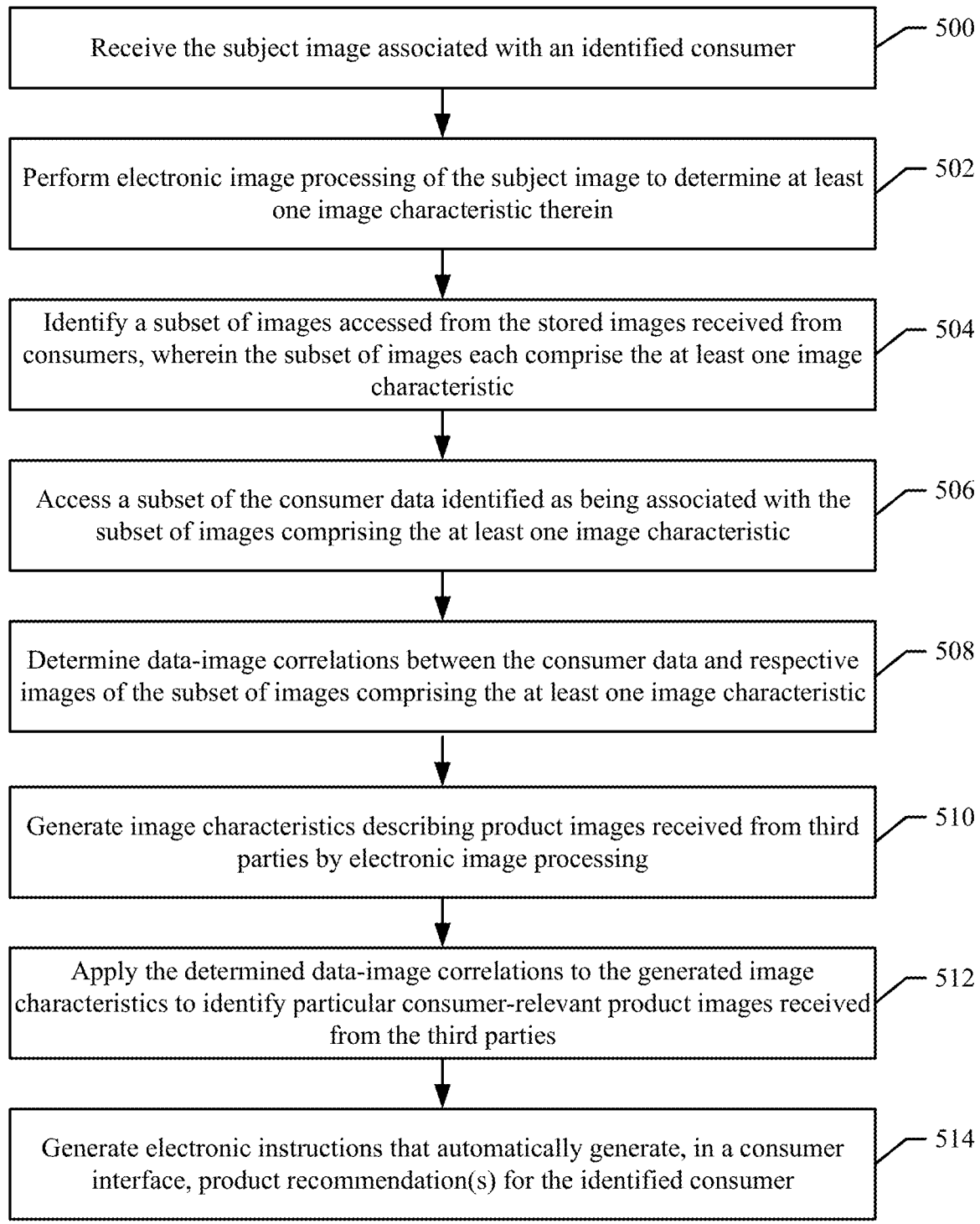
FIG. 5 is a flowchart of operations that may be performed according to various embodiments of the present disclosure.

FIG. 5 is a flowchart of operations which may be performed in accordance with example embodiments. In operation 500, carrier system 100 may include means, such as processing element 205, communications interface 220 and/or the like, to receive the subject image associated with an identified consumer. The subject image may be received by various means, as described below.

Figure 6A:
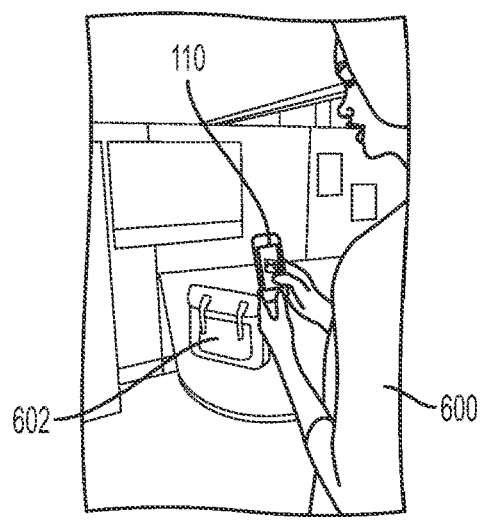
FIGS. 6A and 6B illustrate a user capturing an image, according to various embodiments of the present disclosure.

FIG. 6A illustrates a user 600 capturing an image of an item 602 the user wishes to purchase, according to an exemplary embodiment. In the example embodiment of FIG. 6A, a user 600 may utilize a media capturing functionality of the user computing entity 110, for example, to capture an image of an item(s) (e.g., a purse, a handbag, etc.) that the user is interested in purchasing. The user may then utilize the user computing entity 110 to provide or upload the captured image of the item(s) (e.g., a purse, a handbag, etc.) to a network device (e.g., computing entity 110) of a participating social network with a hash tag such as, for example, #WDIB (e.g., where do I buy). Additionally or alternatively, the captured image may be uploaded directly to the carrier system 100 via a consumer interface communicatively connected to the carrier system via at least one network.

In some examples, a consumer may provide an image which they wish to manipulate with images of potential items to purchase. For example, a consumer may upload or otherwise provide images of themselves, another individual, a pet, or any other object. For example, the consumer may wish to view a picture or themselves, avatar representing themselves, and/or the like "dressed" in clothing items the consumer may consider purchasing. The image manipulation is described in further detail below.

Figure 6B:
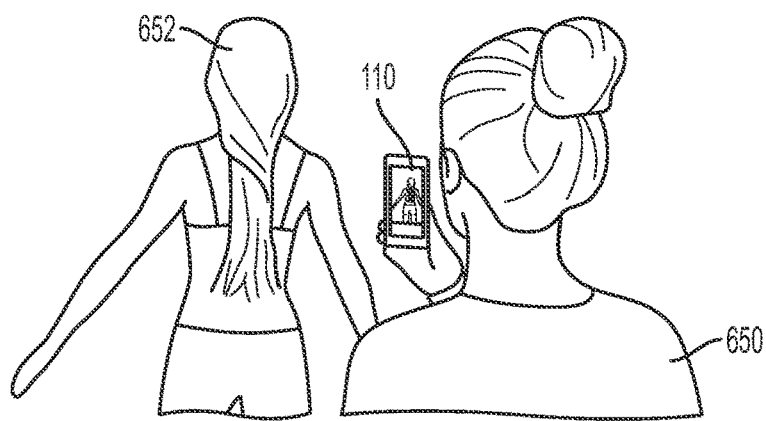

Referring now to FIG. 6B, an illustration of a user 650 utilizing a communication device to capture an image is provided according to an exemplary embodiment. As shown in FIG. 6B, a first user 650 may utilize a user computing entity 110 to capture an image(s) of a second user 652. In this example, the second user, whose image(s) is being captured by the media capturing device, may also utilize a user computing entity 110 to input measurements (e.g., height, chest, waist, hip, inseam, sleeve, and collar) of the second user. In this regard, the mobile computing entity may provide or upload the captured image(s) of the second user and the input measurements (e.g., consumer data) of the second user to carrier system 100.

Figure 6C:
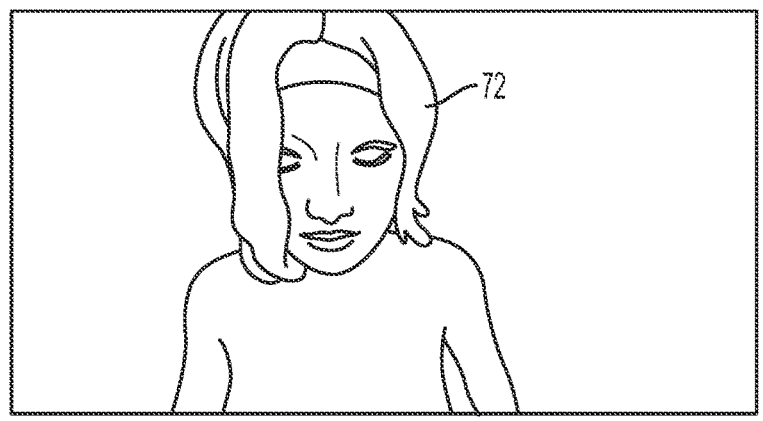
FIG. 6C illustrates an example avatar, according to various embodiments of the present disclosure.

In some examples, the processing element 205 may utilize the captured image(s) of the second user and the input measurements to generate an avatar 72 corresponding to the second user, as shown in FIG. 6C. In this regard, the avatar generated may have features that correspond to the measurements of the second user and some features/attributes of the second user identified in the captured image(s). The avatar may be considered the subject image and may be further processed and/or manipulated as described below.

As another non-limiting example, the consumer-provided image may include a room in a house they wish to decorate, or any other picture of environments, items, objects, and/or the like the consumer would like to see manipulated with an image of a potential product to purchase.

The subject image may be received and manipulated as described in further detail hereinafter to depict clothes on the avatar of a person, furniture imposed on a picture of a room, and/or the like. The image may be stored on any of volatile memory 210, non-volatile memory 215, consumer provided image repository 412, and/or the like.

In operation 502, carrier system 100 may include means, such as processing element 205, and/or the like to perform electronic image processing of the subject image to determine at least one image characteristic therein. Example embodiments may employ any electronic image processing or analysis techniques such as but not limited to edge detection, object recognition, pose estimation, motion detection, feature detection, feature selection, feature extraction, dimensionality reduction, color analysis and/or the like. As other examples, point analysis and/or pixel by pixel analysis may be performed to extrapolate and/or estimate measurements and/or dimensions. For example, edge detection, pattern recognition, and/or the like may be used to extrapolate edges of objects and to identify patterns associated with particular object types, thus enabling the carrier system 100 to identify an object, such as a purse, and/or the like. Color analysis of individual pixels may enable carrier system 100 to identify materials and/or texture of objects. As another example, the carrier system 100 may employ object recognition to identify subparts or components of a photographed item, such as buttons on a clothing article, zippers on purses, and/or the like. Detected reflection of light on particular components, such as metal or other shiny or reflective surfaces, may determine the materials of the item in an image.

In some embodiments, image processing of subject images may include supervised or semi-supervised learning, and/or training artificial neural networks. For example, some images (e.g., other subject images, and/or product images, described in further detail below) may have associated metadata or other data describing the images. Example embodiments may additionally process those images according to various image processing and analysis techniques and learn which image features are associated with which image characteristics. When subject images are processed, example embodiments may apply the learned image processing techniques to intelligently predict which features or image characteristics are depicted in a particular subject image.

Of course, it should be understood that the aforementioned image analysis and/or processing techniques are non-limiting examples and various image analysis techniques may be utilized, as those of skill in the art would readily recognize.

Image characteristics of an object may include any data describing, for example, the object type, size, color, shape, texture, materials, clothing or accessory style (e.g., trendy, casual, exotic, vibrant, preppy, elegant, bohemian, artsy, business, sporty, vintage, tightly fitting, loosely fitting), décor style (e.g., rustic, trendy, antique, vintage), and/the like.

In example embodiments such as those in which the image is an individual, image characteristics may include characteristics relating to body type (e.g., ectomorph, mesomorph, endomorph, hourglass, pear-shaped, square shoulders), height, weight, skin tone, hair color, dominant body features, hairstyle, and/or the like. In some examples, the consumer may provide additional information, such as a brief product description, color, size, style, and/or the like to clarify what they are looking for. The carrier system 100 may store this as metadata in associated with the image characteristics and utilize the metadata in identifying production recommendations, as described below.

The above provided image characteristics are provided merely as examples and it will be appreciated that any image characteristics that may be determined via image analysis techniques may be identified according to example embodiments. The determined image characteristics may then be stored in association with the respective consumer-provided image.

In operation 504, carrier system 100 may include means, such as processing element 205, and/or the like to identify a subset of images accessed from the stored images received from consumers, wherein the subset of images each comprise the at least one image characteristic. Having identified image characteristics of the subject image, example embodiments may access the consumer-provided images repository 412 to identify and/or cross-associate images having the same or similar image characteristic. In this regard, example embodiments may identify previously provides images (e.g., by other consumers) that are similar to the subject image. Example embodiments may therefore identify images that are of the same type (e.g., handbag, couch, wall décor, and/or the like), or have another other image characteristics in common (e.g., color, size, quality and/or the like).

In some embodiments, electronic image processing and/or electronic image analysis alone may not necessarily deliver a subset of images that are all relevant to the subject consumer. The subset of images may be considered a first pass of narrowing down all the available images to those that are likely relevant.

In some image processing systems, imperfections in the processing algorithms, or defects (e.g., shadows, blurriness, etc.) in the images may cause error or mischaracterization of the images. Product recommendations relying on image processing techniques alone may suffer from irrelevant recommendations, which may result in user dissatisfaction and decreased use of the particular system or interface. Decreased use in the system may result in fewer shipper, vendor, retailer or other third party participants, fewer advertisers, and therefore decreased revenue. Consumers may therefore otherwise need to spend more time on web interfaces searching and browsing for desired products that meet their needs, thereby utilizing additional processing resources of the underlying systems. Therefore, systems relying on image processing alone to provide relevant or recommended products, may suffer from several undesirable deficiencies.

In this regard, example embodiments may access consumer data to further identify relevant images from the subset of images identified according to the electronic image processing and image characterize determination. This may help eliminate or reduce the number of irrelevant images and/or products from the subset of images identified.

As such, in operation 506, carrier system 100 may include means, such as processing element 205, and/or the like to access a subset of the consumer data identified as being associated with the subset of images comprising the at least one image characteristic. The consumer data may include any data relating to consumers, consumer preferences, and/or consumer purchase history, such as that stored on consumer database 411 and described with respect to FIG. 4. In this regard, example embodiments may identify consumers that have similar tastes in products, or have similar body types and/or styles of the consumer that provided the subject image. The carrier system 100 may therefore learn consumer trends and preferences as described in further detail below.

In operation 508, carrier system 100 may include means, such as processing element 205, and/or the like, to determine data-image correlations between the consumer data and respective images of the subset of images comprising the at least one image characteristic. As more consumer-provided images are received, and more data is collected regarding the consumers, correlations may be determined, adjusted, and/or improved based on a variety of methods. For example, image characteristics may be plotted against consumer data and regression models and/or regression curve-fitting may be used to identify correlations between the images characteristics and data. The data-image correlations may therefore be indicative of what images may likely be well received by a particular consumer. Similarly, data-image correlations may link data describing consumers to images of other bodies and/or people that could be used as an avatar to closely resemble a particular consumer.

In some embodiments, recommendation algorithms and/or systems may be utilized to identify a relevant subset of images accessed from the stored images. For example, consumers identified as having purchased similar products or recommended similar products to those also purchased by the subject consumer may be identified as being a part of a similar consumer base. In this regard, image characteristics of product images purchased by similar users may be used to infer preferences of the subject consumer. Collaborative filtering may be utilized in example embodiments to make automated and intelligent predictions regarding similar consumer bases, subject images, product images, and/or the like. Look-alike modeling, and/or cluster analysis may be similarly utilized to identify similar subject images, and predict similarities in consumer bases and preferences. For example, consumers having similar product preferences and/or characteristics such as zip code, similar educational background and/or the like may be grouped or classified together. Other similarities amongst the classifications may then be identified as meaningful or significant such that additional similar consumers may be identified. Product recommendations as described in further detail below may then be made to similarly classified consumers.

The data-image correlations may be stored in non-volatile memory 210 and/or volatile memory 215, for example. The data-image correlations may be stored as any data associating the consumer data to images and/or image characteristics. For example, consumer data indicating a body type of mesomorph may have correlations to a subset of images of clothing articles that are identified or classified as sporty, tightly fitting, and/or the like. Consumer data indicating a body type of hourglass may have correlations to images of clothing types that are identified as loosely fitting, bohemian, and/or the like.

Consumer data indicating an individual is career-oriented, or in a professional career, may be correlated to images of clothing articles that are identified, such as by image processing techniques and/or product data, as business clothes. As another non-limiting example, consumer data indicating décor preferences of antiques may be correlated with images of antique furniture.

In some embodiments, the data-image correlations may be stored as weighted correlations. For example, consumer data indicating fair-skinned complexions may have a 90% correlation to clothing in warm color families (as identified by color analysis of the images, for example), and a 45% correlation to loosely fitting clothing. This may indicate a stronger correlation from skin complexion to color than skin complexion to fit of clothing. In this regard, carrier system 100 may subsequently utilize the skin complexion to color correlation but not the skin complexion to fit of clothing.

The carrier system 100 may efficiently identify trending correlations in an automated and real-time manner by continuously adjusting statistical and/or regression models. For example, the determined data-image correlations may identify trends developing in specific geographic locales which may otherwise have gone undetected. As another non-limiting example, the data-image correlations may determine shifts in clothing or styles trends amongst particular groups of consumers (e.g., based on generation, race, socio-economic status and/or the like). The data-image correlations may further determine that consumers having a particular preference for style A may be more likely to develop a preference for style B than style C. In this regard, incorporating the consumer data and the processing of consumer-provides images into an automated and streamlined process enables example embodiments to efficiently determine and predict changes in trends and styles amongst consumers.

In some embodiments, the carrier system 100 may therefore predictively adjust consumer data associated with the identified consumer based on correlations of other consumer data and respective associated images. In this regard, as a group of consumers identified as being similar to a subject consumer alter their preferences and/or provide images having different characteristics, the consumer data of the subject consumer may be predicatively adjusted to reflect the same trend or shifts in preferences. In this regard, the carrier system 100 intelligently learns preferences and styles from other consumers and applies them to a subject consumer having similarities with the studied consumer base.

Additional indicators of interest which may be utilized by example embodiments in determining data-image correlations may include duration of time a product is rendered on the display of a consumer device (e.g., how long the consume views the products, and/or frequency of display of the same or similar items. In some embodiments, analysis of curation sites (e.g., Pinterest) provides additional data for example embodiments to intelligently infer and/or procure consumer data and/or preferences.

In operation 510, carrier system 100 may include means, such as processing element 205, and/or the like, to generate image characteristics describing product images received from the third parties, by performing electronic image processing. In this regard, product images from the third party provided product data repository 414 may be accessed by the carrier system to be processed and/or analyzed such that image characteristics may be efficiently identified. The automation of such a process in real-time or near real-time enables example embodiments to efficiently assess images of newly released or offered products as they become available by various third parties. The third party provided product data repository 414 may be updated with new product offerings on a continual and ongoing basis. As additional images are received, the carrier system 100 may process the images and identify image characteristics in the third party provided product images as described above.

In some embodiments, electronic image processing may include determining or inferring information from metadata. The metadata may be provided by the third party that provides the respective product images. For example, the product images may have associated descriptors and/or tags indicated color, brand, size, material, and/or the like.

In operation 512, carrier system 100 may include means, such as processing element 205, and/or the like, to apply the determined data-image correlations to the generated image characteristics to identify particular consumer-relevant product images received from the third parties. In this regard, the previously determined data-image correlations may be applied, such as by way of regression and/or other statistical models, to third party provided product images. Third party provided product images falling in close proximity on a plot of a fit regression curve, for example, may be identified as consumer-relevant. In this regard, the consumer-relevant images may reflect the same or similar characteristics to images identified by consumers that have the same or similar consumer data as the subject consumer. Supervised learning, and/or training of artificial neural networks may additionally or alternatively utilized in applying the determined data-image correlations to the image characteristics to identify consumer-relevant product images.

In operation 514, carrier system 100 may include means, such as processing element 205, communications interface 220, and/or the like, to generate electronic instructions that automatically generate, in a consumer interface, product recommendation(s) for the identified consumer. In this regard, the carrier system 100 may generate application code that when executed, causes an impression or other advertisement comprising product recommendation(s) to be presented to the subject consumer. The subject consumer browsing a site of any of the third parties and/or the carrier system 100, for example, may be presented with an impression, advertisements, and/or the like.

The displayed product recommendation may comprise any number of images and/or product data. For example, an image provided to the consumer may include a third party provided product image of the recommended product, the consumer-provided image, or a combination thereof.

Figure 7:
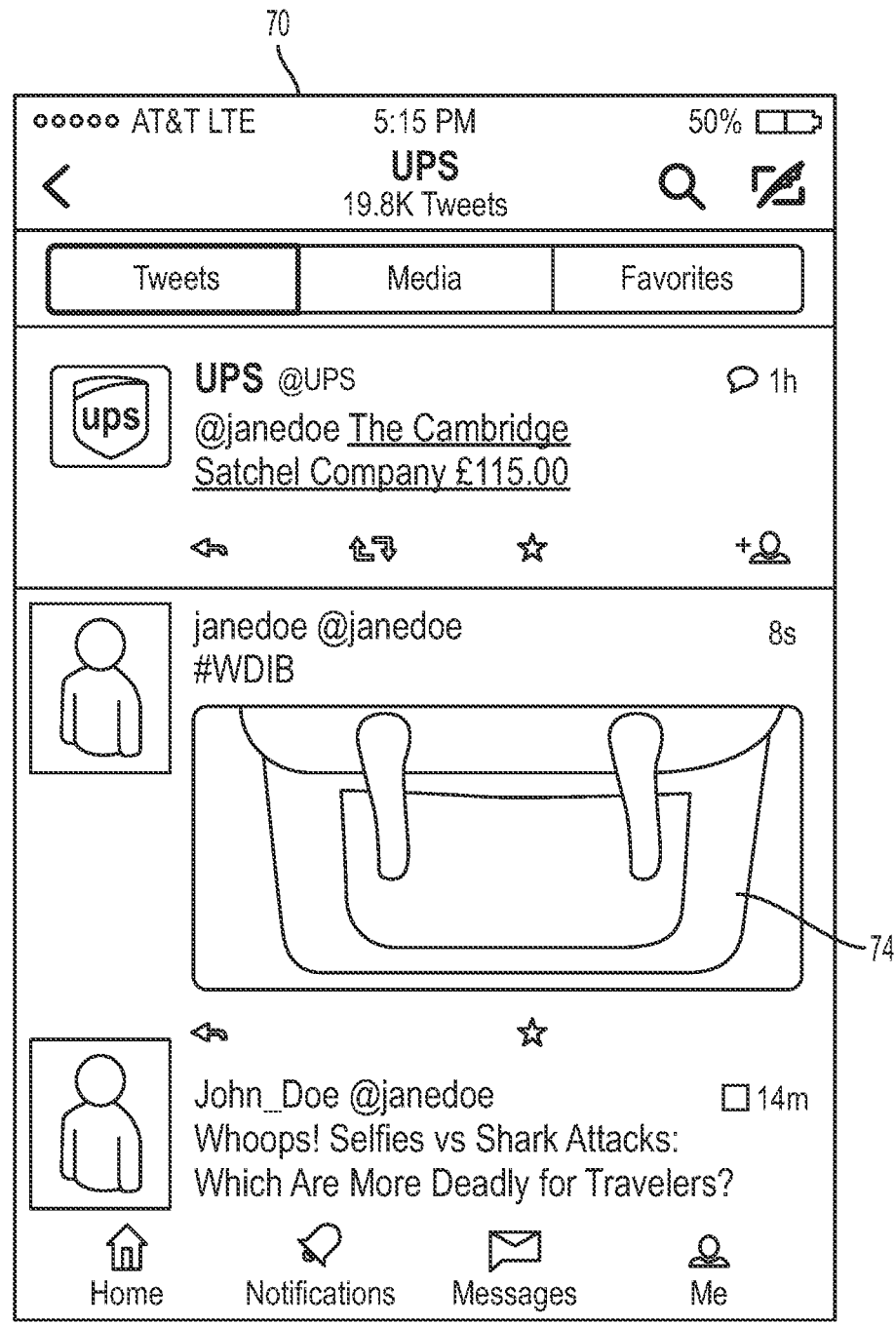
FIG. 7 illustrates an example interface, according to various embodiments of the present disclosure.

Referring now to FIG. 7, an example display of consumer interface illustrating visible indicia indicating where the item(s) may be purchased is provided according to an exemplary embodiment. Referring to the example of FIG. 6A described above, in response to receipt of the captured image of the item(s) (e.g., a purse, a handbag, etc.), the carrier system 100 may generate the electronic instructions that automatically generate the visible indicia associated with a product recommendation (e.g., visible indicia 70) to the consumer interface of a user computing entity 110, for example. The indicia may include an image of the product 74. The indicia may include an entity (e.g., a store (e.g., The Cambridge Satchel Company)) where the item(s) (e.g., a purse, a handbag, etc.) may be purchased. In an example embodiment, the visible indicia may be provided at least via the carrier system 100, a consumer interface, and optionally via a social networking interface and/or the like, to a user interface of the user computing entity 110. The visible indicia may also indicate the price (e.g . . . , £115.00) of the item(s).

In some embodiments, product recommendations provided to the subject consumer may include brand, shipping options and/or eligibilities, links to lower or higher priced similar items, aggregate rating of similar users, and/or the like.

In some examples, tailored or personalized product reviews by consumers who are similar the subject consumer may be provided in a visible indicia, product recommendation and/or the like. In some examples, consumer preferences may be inferred from emoji's, "like" indicators, wish lists, social media postings seeking product recommendations or endorsements, and/or the like. Products reviews such as those indicating like, dislike, indifference, satisfaction, dissatisfaction, and/or the like may, also be used in determining recommendations or including in a product recommendation indicia. A certain example embodiment may provide, for example, recommendations such as, "3 of your friends purchased item ABC but didn't like it." As another example, example embodiments may infer preferences from past product purchases, and provide recommendations to family or friends of the purchaser as gift recommendations.

Carrier system 100 may additionally or alternatively generate and/or transmit personalized notifications to consumers, carriers, and the third party (e.g., shipper, retailer, vendor, manufacturer, and/or like). In this regard, the carrier system 100 may customize and/or predict delivery preferences and/or notifications based on a variety of factors including but not limited to, product type and preferences of other similar consumers. For example, the carrier system 100 may intelligently determine a product is a perishable item and automatically upgrade a default delivery preference to expedited or refrigerated, for example. Similarly, the carrier system 100 may cause notifications settings for delivery of a perishable item or other high priority delivery might to default to the highest level of notification (e.g., notify a consumer via multiple communications means and at all available tracking points during shipment). A lower priority item, on the other hand, may have a lower level of notification, in which the consumer is notified only upon delivery and only via their preferred communication method (e.g., email). Further, the content of such alerts and/or notifications may be tailored for the particular consumer, third party, and/or carrier. The notifications may be customized by any of the consumer, third party, and/or carrier so the desired type and number of notifications are received. More detail regarding delivery preferences and notification preferences is provided in U.S. Publication No. 2013/0275328, "Systems and Methods for Providing Personalized Delivery Services," U.S. Publication No. 2013/0212036, "Customer Controlled Management of Shipments," and U.S. Publication No. 2015-0066798 "System, Methods and Computer Program Products For Providing Customized-Communication Content in Conjunction with Transport of a Plurality of Packages," all of which are hereby incorporated by reference in their entireties. Delivery preferences are described in further detail below with regard to operation 954.

Due to the automated processes employed by the carrier system 100 to continually receive and process images from third parties, product recommendations of new products may be proactively provided to consumers in near real-time as they are received. Consumers may therefore be alerted of new products they may like within a day of the new products becoming available. Similarly, products meeting a consumer's predicted needs based on changing trends of a similar consumer base may be provided to a subject consumer shortly after the change is detected. Further, products recommended based on actions, browsing activity, and/or the like of a subject consumer, or consumers of a similar consumer base. This may enable the carrier system 100 to proactively predict what the subject consumer may want to see or purchase. Consumers may therefore benefit from being alerted of new products, products meeting their newly predicted needs. Consumers may be one of the first consumers to purchase a product (including older products) consistent with a hot new trend, in some instances even before the consumer in question is aware of the hot new trend.

As another example, real-time analysis of image characteristics optionally paired with long tail search queries might identify imminent purchase intent and/or high-priority preferences of a consumer. If a consumer has provided a search query or long tail search including specific descriptions, such as "slim fitting light-weight bright men's workout shirt," product images included in the search results may be utilized to intelligently provide product recommendation and/or the like to similar consumers. Consumers searching for broader search terms such as "men's shirt" may be provided the suggest search terms, particularly if the subject consumer has associated consumer data that is similar to the consumer having provided the long tail search. In some examples, even if the search terms are not suggested and/or selected by the subject consumer, similar products based on the long tail search may be recommended. In this regard, product recommendations may be further based on natural language processing and provision, as described in further detail below with respect to FIG. 10.

Figure 8:
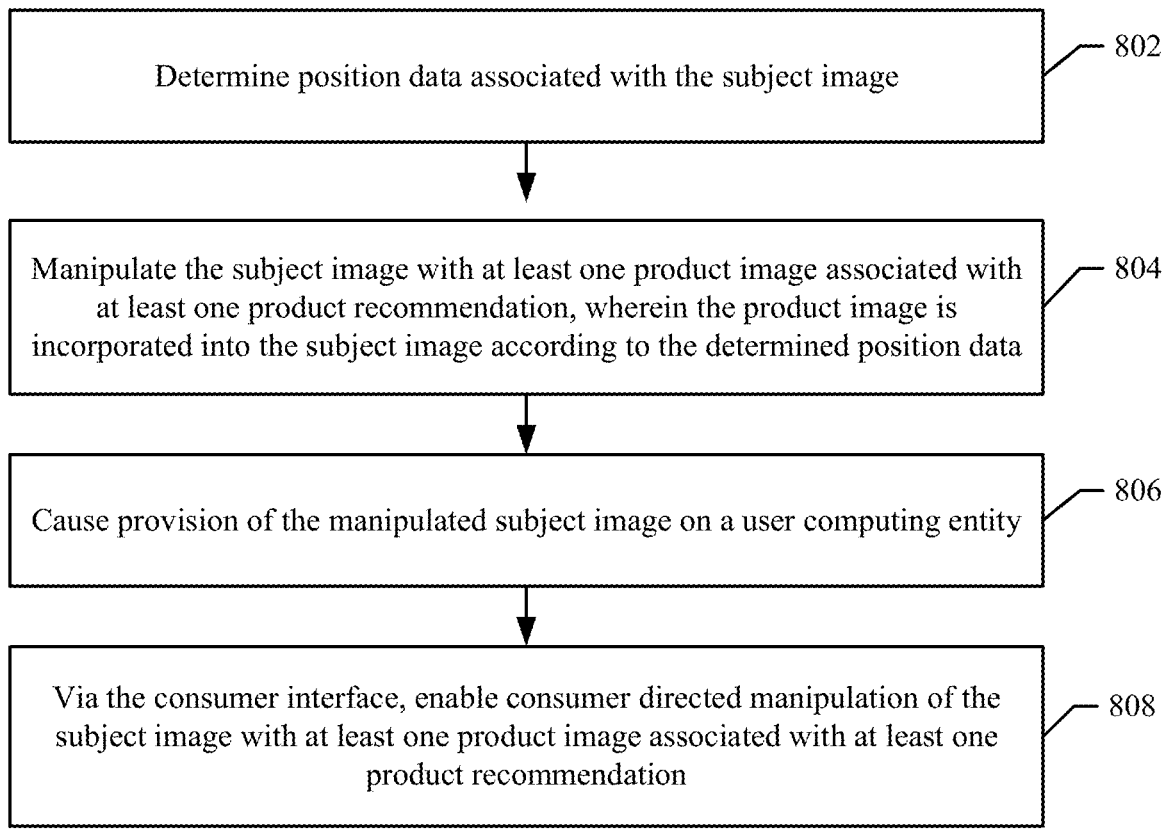
FIG. 8 is a flowchart of operations that may be performed according to various embodiments of the present disclosure.

FIG. 8 provides example operations for manipulating an image according to example embodiments. In operation 802, carrier system 100 may include means, such as processing element 205, and/or the like to determine position data associated with the subject image. In an instance the subject image includes an individual or avatar (e.g., image of the subject consumer, or representation thereof), the carrier system 100 may perform electronic image processing to identify key features such as key bodily features, and/or the like. The position data may enable carrier system 100 to manipulate the subject image with images of recommended products and/or the like, as described below. The position data may therefore include coordinates of identified arms, legs, facial features, shoulders, joints, hairlines, hands, feet, hips, and/or the like. As another non-limiting example, a subject image that includes a room to be decorated, may include a user-provided indication of where furniture or accessories should be placed. The position data may be stored in memory in association with the subject image.

In operation 804, carrier system 100 may include means, such as processing element 205, and/or the like, to manipulate the subject image with at least one product image associated with at least one product recommendation, wherein the product image is incorporated into the subject image according to the determined position data. Carrier system 100 may therefore access product database 415 to determine a type of product (e.g., pants, shirt, and/or the like) and the associated position on an avatar on which the image should be imposed. The carrier system 100 may access predefined correlations of the object or clothing article type to the position on an avatar in which it should be placed. The subject image may therefore be manipulated to include the avatar or other subject wearing a clothing item that is a recommended product for the subject consumer. Images associated with recommended products may therefore be superimposed or merged with subject images such that an avatar or image representing the subject image appears dressed in the recommended product, or holding the recommended accessory, for example. Similarly, subject images of rooms may be manipulated to include images of furniture, décor, and/or the like. Additional image processing techniques, such as blending, fading, and/or the like may be further applied so as to create a realistic manipulated image for presentation to the consumer.

For example, carrier system 100 may provide fashion technology that may enable users to preview articles of clothing on a personal three-dimensional (3D) avatar. A consumer may utilize, for example, a user interface of the user computing entity 110, to input height, chest, waist, hip, inseam, sleeve, collar measurements, and photos of the user taken from different angles. The data may be stored as consumer data in consumer database 411. The carrier system 100 may provide design services that "dress" the avatar to suggest items for purchase. Recommendations may improve over time based on learning the individual's style and aggregating information on what consumers with similar size, shape, and style profiles purchase.

Example embodiments may also provide the ability to catalogue items already owned by consumers and "try them on" with new items. Knowledge, acquired by the processing element 305, of what a user already owns may improve targeting for advertisers. For example, if a consumer has previously purchased clothing of a particular brand and/or style, the carrier system 100 may recommend other similar products, such as those purchase by other consumers that have a same or similar article in their wardrobe.

In this regard, example embodiments may provide for both image manipulation of the subject image with third party provided product images and also additional consumer-provided images (or other third party provided product images identified as previously purchased by the consumer). The image manipulation may therefore occur at least partially under the direction of the carrier system 100 (e.g., based on position data of the subject image) and/or partially based on user direction or user configuration of a consumer interface.

Example embodiments may further provide the ability to share outfits with friends (e.g., yet to be purchased or already owned) and to obtain feedback. An entity (e.g., a carrier and/or third party.) may be paid a percentage of referred product sales and/or license information to advertisers.

In operation 806, carrier system 100 may include means, such as processing element 205, communications interface 220, and/or the like to cause provision of the manipulated subject image on a user computing entity. Similar to operation 514 above, electronic instructions may generate the manipulated image in an advertisement, promotion, impression, and/or the like, such as via email, or interface to carrier system 100 and/or third party, for example.

In operation 808, carrier system 100 may include means, such as processing element 205, and/or the like to enable consumer directed manipulation of the subject image with at least one product image associated with at least one product recommendation. The user directed manipulation may be performed via a consumer interface, for example.

Figure 9:
FIG. 9 illustrates an example interface, according to various embodiments of the present disclosure.

Referring to FIG. 9, a diagram of an interface illustrating an avatar corresponding to a user in which one or more virtual items of clothing are provided for trying on by the avatar is provided according to an exemplary embodiment. As shown in FIG. 9, the avatar 72 (e.g., avatar 72) may be presented via a user interface of a display device (e.g., display 416) and the avatar may virtually try on one or more virtual items 90 (e.g., clothing). In this regard, the user may drag and drop, or select by any other means, articles of clothing to view on the avatar. Additionally, the user interface may curate or present one or more images of items of clothing that the user (e.g., the second user in the above example) desires to purchase. Furthermore, the avatar (e.g., avatar 72) may virtually try on virtual items of clothing (e.g., images of clothing uploaded from a memory device) that the user already owns which may be presented via the user interface. Additionally, the carrier system 100 may proactively provide suggestions, to the user interface of one or more items of clothing that match a user's style (e.g., a style indicated in a user profile). Based on the user's configuration or direction of the interface, the avatar 72 may be manipulated with any of the selected virtual items 90.

Figure 10:
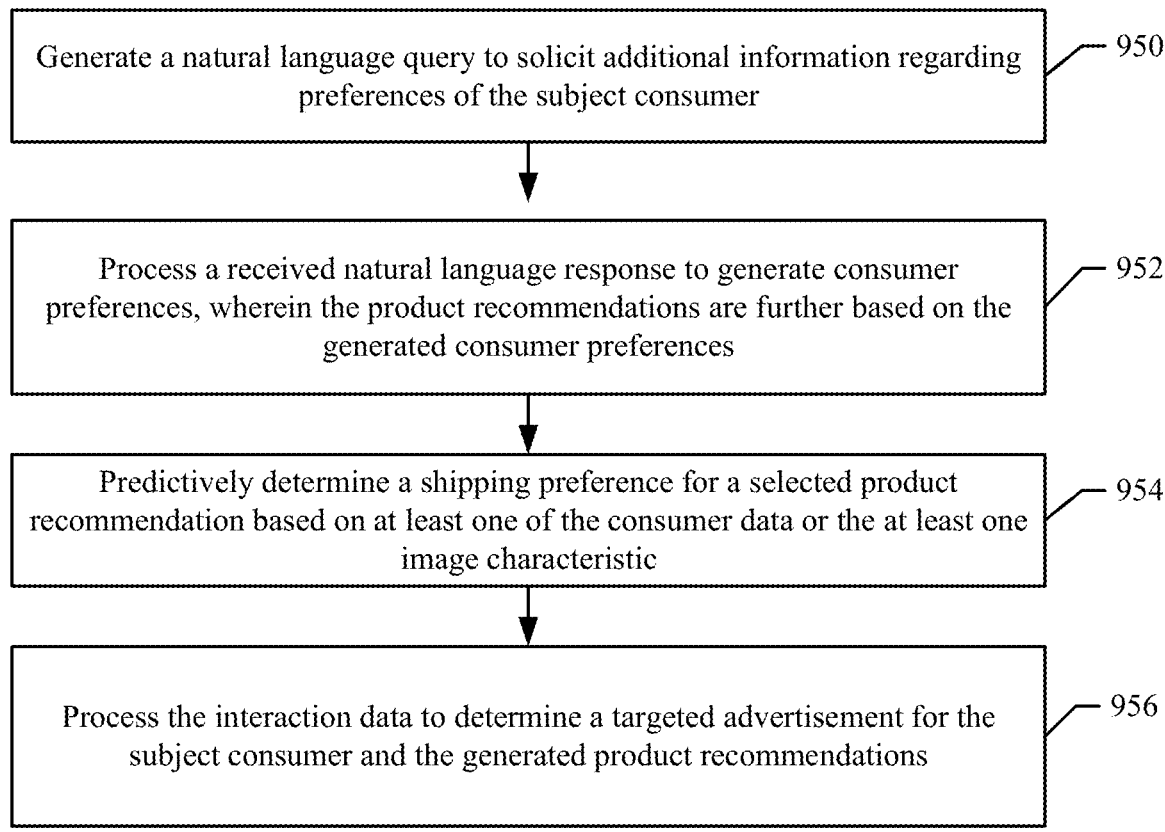
FIG. 10 is a flowchart of operations that may be performed according to various embodiments of the present disclosure.

FIG. 10 is a flowchart of operations that may be performed according to example embodiments. In operation 950, carrier system 100 may include means, such as processing element 205, and/or the like to generate a natural language query to solicit additional information regarding preferences of the subject consumer.

In an example embodiment, carrier system 100 may provide global customer service in a local language by using artificial intelligence to assess what issue the consumer is experiencing in finding a desired product, taking into account channel shorthand and slang. The carrier system 100 may help consumers before they know they need help. For example, if the carrier system 100 determines that similarly situated consumers encounter a particular issue with a hot new trend, the carrier system 100 may proactively assist the current consumer with that issue while at the same time making them aware of the hot new trend and/or of a particular opportunity to purchase the related recommended products.

In some embodiments, carrier system 100 may predict or determine that a subject image does not have the quality necessary to adequately process to extrapolate meaningful information. In this regard, carrier system 100 may intelligently offer assistance to the user, such as, but not limited to moving their image capture device to a better lit area, changing the focus with which to capture the image, and/or reposition the item for photographing. The carrier system 100 may therefore predict issues a user may have and offer to assist with lighting, if the carrier system 100 determines that an image is blurry and/or dark, for example. In some embodiments, carrier system 100 may intelligently determine that the image processing could be improved if the item were photographed from additional angles, and may therefore prompt the user to move the item (e.g., with specific positional directions), and to take additional photographs.

The carrier system 100 may generate automatic replies and/or queries via common platforms such as a buyer centric website or app, Facebook™ messenger, WhatsApp™, or via Short Message Service (SMS) or Multimedia Messaging Service (MMS) messaging. As another example, messages may be provide to consumers when consumers are browsing for products on third party websites. The consumer may therefore be prompted to provide additional information which may enable the carrier system 110 to further based the recommend products based on the additional information provided by the consumer. In some embodiments, data may be collected and/or inferred from voice interfaces such as but not limited to Alexa, Siri and/or Echo.

As an example, when carrier system 100 identifies a wide array of third party provided product images that would possibly result in product recommendations, a natural language component may generate questions to further narrow the recommended products. Questions may reflect a tactful manner in which to inquire the desired price range for the product, the desired product quality, and/or the like. For example, the carrier system 100 may inquire, "We have identified a variety of handbags meeting your needs, ranging from $15 to $3,000. What is your preferred price range for the handbag?"

In operation 952, carrier system 100 may include means, such as processing element 205, and/or the like to process a received natural language response to generate consumer preferences, wherein the product recommendations are further based on the generated consumer preferences. In this regard, natural language message provided by the consumer, such as those provided via a social networking site, may be processed and interpreted by the carrier system 100 to generate consumer preferences. For example, the user may respond, "I want a handbag under $70 but still a reasonable quality for the price." The carrier system 100 may intelligently interpret the information to include a consumer preference for products rated as "good value." The newly generated consumer preferences may be utilized to further narrow identified third party provided product images that may meet the user's needs.

In an example embodiment, the natural language assistance may recognize and process commands such as, "not now, but remind me later" or "save this for Andres's birthday," and prompt the consumer at a later time accordingly. In certain embodiments this type of data may be passively learned via observation, for example, of when birthday presents are bought over the course of a year. Additionally or alternatively, example embodiments may learn about post-purchase satisfaction that can be used in future recommendations. Example embodiments may track preferences such as size variances by brand. Example embodiments may provide natural language assistance, such as, "How did the Cole Haan shoes fit?" "I'm happy to hear that . . . would you like me to look for a pair in another color?" As another example, an indication of dissatisfaction may lead to natural language assistance such as, "I'm sorry to hear that, would you like me to look into return options?" Example embodiments may provide other intelligent assistance based on trip bookings or other purchases: "I see you have a flight booked to the Caribbean. Would you like me to order some sunscreen for you? You haven't purchased any in 2 years."

As another example, certain embodiments may access calendar events and/or events from social media sites and enquire, "Vanessa's wedding is in 2 months. Have you found a dress yet? You might like these." Based on real-time GPS tracking, example embodiments may detect a consumer is running late in comparison to a usual or average schedule, and suggest, "Looks like you're running a bit late today. Do you want me to place an order with UberEATs so that dinner is ready when you get home?" Example embodiments may further track shipped packages by a carrier and/or retailer and provide intelligent assistance, such as follows: "You have two packages arriving today. Would you like me to tell UPS™ to leave them in the same place?" The consumer may then be guided down an additional workflow or process flow accordingly, such as for additional purchases, returns and/or shipping preferences.

In operation 954, carrier system 100 may include means, such as processing element 205, and/or the like to predictively determine a shipping preference for a selected product recommendation based on at least one of the consumer data or the at least one image characteristic. Example shipping or delivery preferences may include, but are not limited to messaging and notification settings regarding attempted deliveries, e-signature and/or driver release preferences, automatic shipper release preferences, delivery intercept instructions, service upgrades, preferred time windows, alternative delivery locations, and/or the like. In one example, a consumer may have personalized an alternative garage delivery location at their house. Based on past delivery location selections, and/or inferences determined from the image characteristics associated with product recommendations, the carrier system 100 may predict that the consumer wishes to have particularly large items (e.g., larger than a threshold size or above threshold dimensions) delivered to their garage instead of the front door. As yet another example, carrier system 100 may intelligently determine an item is sensitive to extreme weather (e.g., wine, pressurized canisters, and/or the like), and may change a delivery preference to signature required. Preferred delivery time windows may be predicted based on product types and or other preferences of similar consumers. The carrier system 100 may therefore infer information based on product data and/or product images, and predict personalized shipping preferences of the consumer.

In operation 956, carrier system 100 may include means, such as processing element 205, and/or the like, to process the interaction data to determine a targeted advertisement for the subject consumer and the generated product recommendations. An advertisement or impression provided to a consumer may therefore include the manipulated imaged, such as an avatar superimposed with a recommended article of clothing or accessory, for example. In some examples, the targeted or personalized advertisement may include product recommendations and corresponding product data.

Once a consumer base provides, for example, to the carrier system 100, personal data including size and/or photos and agrees to share that information for marketing purposes, marketers may Snapchat™ a message with a photo to a user that shows how their product looks on that consumer at times when a user is likely to buy the product(s). Another benefit may include the rapid expiration of the message and corresponding need of the user(s) to act quickly. The time identified as a time the consumer is likely to purchase may be based on consumer data, such as but not limited to purchase history, browsing history, and/or the like.

Additionally or alternatively, the carrier system 100 may invite users to "try on" an outfit via Instagram™ or Pinterest™. Consumers may benefit by setting preferences, for example, such as "I only want to see marketing messages for items available in my size." In some example embodiments, the preferences may be inferred and/or generated by carrier system 100 based on other consumer preferences of consumers having similar associated consumer data. In this regard, carrier system 100 may predict or learn what types of advertisements, promotions, and/or impressions are most likely to result in a purchase by a consumer.

This level of personalization in marketing provided by the carrier system 100 may garner significantly more attention than discovery tactics of existing approaches. Existing social platforms may be leveraged as channels to reach consumers, but a new dataset of consumer-provided information (e.g., photos of items consumers want to buy, body dimensions and photographs, photographs of homes, etc.) may be built. This solution may put a carrier (e.g., UPS™ Inc.) at the center of a transformed shopping experience that begins with highly personalized visualization.

Example embodiments also provide many technical advantages. Determining the data-image correlations within the carrier system 100 may provide distinct advantages such as when compared to manual processes of reviewing consumer style preferences and/or the like. The consumer data may include hundreds or thousands of data points per consumer. The carrier system 100 may receive thousands of consumer-provided images per day. Manual review of the data and images would require a large number of data scientists to manually review the data and to collaborate, such that evolving and fast moving trends would be detected late, or would not be detected until they were already outdated. Likewise, automatically processing the third party provided product images as they are received from third parties will result in efficient notification to consumers regarding new and relevant products. Example embodiments provide an enriched and transformed personalized shopping experience in which highly relevant products are provided to consumers, via manipulated images with which consumers can envision what a clothing item would look like on themselves, or envision a home furnishing in their home. Without the benefit of example embodiments provided herein, consumers may otherwise need to spend more time on web interfaces searching and browsing for desired products that meet their needs, thereby utilizing additional processing resources of the underlying systems. Example embodiments therefore promote the conservation of processing resources and processing power associated therewith.

IV. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for processing a subject image, consumer data and product images to generate product recommendations, the system comprising:

at least one processor; and at least one memory device for storing (a) images received from a subject consumer, (b) the consumer data relating to at least one of consumer preferences, consumer purchase history, consumer browsing history, or consumer location, and (c) third party product images;

wherein the at least one processor of the system is configured to:

receive the subject image associated with a subject consumer;

perform electronic image processing of the subject image to determine at least one image characteristic of the subject image wherein the at least one image characteristic includes at least one of quality, shape, or material;

identify a subset of images accessed from the stored images received from the subject consumer, wherein the subset of images each comprise the at least one image characteristic;

access a subset of the consumer data identified as being associated with the subset of images received from the subject consumer comprising the at least one image characteristic;

perform electronic image processing of the third party product images to determine at least one image characteristic of the third party product images, wherein the at least one image characteristic includes at least one of quality, shape, or material;

based on a regression curve fitting analysis, determine data-image correlations between at least one of the subject image, the images received from the subject consumer, or the third party images, wherein the regression curve fitting analysis utilizes at least one of the consumer data, the determined at least one image characteristic of the third party product images, the determined at least one image characteristic of the subject image, or the determined at least one image characteristic of the images received from the subject consumer, wherein proximity along the regression curve determines correlation weight;

store the data-image correlations based on strength of correlation determined by correlation weight;

apply the determined data-image correlations having a correlation strength over a predetermined threshold to identify particular consumer-relevant product images received from the third parties;

based on applying the data-image correlation, generate electronic instructions that automatically generate, in a consumer interface, the product recommendations for the subject consumer; and predictively determine a shipping preference for the product recommendations based on the consumer data and the at least one image characteristic.

2. The system of claim 1, wherein the at least one processor is further configured to:

predictively adjust consumer data associated with the subject consumer based on correlations of other consumer data and respective associated images, wherein the product recommendations are further generated based on the predictively adjusted consumer data.

3. The system of claim 1, wherein the at least one processor is further configured to:

determine position data associated with the subject image;

manipulate the subject image with at least one product image associated with at least one product recommendation, wherein the product image is incorporated into the subject image according to the determined position data; and cause provision of the manipulated subject image on a user computing entity.

4. The system of claim 1, wherein the at least one processor is further configured to:

via the consumer interface, enable consumer directed manipulation of the subject image with at least one product image associated with at least one product recommendation.

5. The system of claim 1, wherein the at least one processor is further configured to:

generate a natural language query to solicit additional information regarding preferences of the subject consumer; and process a received natural language response to generate consumer preferences, wherein the product recommendations are further based on the generated consumer preferences.

6. The system of claim 1, wherein the at least one memory device further stores (d) interaction data describing consumer interactions with electronic advertisements, and the processor is further configured to:

process the interaction data to determine a targeting advertisement for the subject consumer and the generated product recommendations.

7. The system of claim 1, wherein the subject image is received via an external consumer-facing third party system.

8. The system of claim 1, wherein the subject image is received via the consumer interface communicatively connected to the system via at least one network.

9. The system of claim 1, wherein the at least one memory device further stores consumer data relating to the subject user's calendar.

10. A computer-implemented method for processing a subject image, consumer data and product images to generate product recommendations, the method comprising:

receiving and storing within one or more memory storage areas of a system, (a) images received from a subject consumer, (b) the consumer data relating to at least one of consumer preferences, consumer purchase history, consumer browsing history, or consumer location and (c) third party product images;

receiving the subject image associated with a subject consumer;

performing electronic image processing of the subject image to determine at least one image characteristic of the subject image wherein the at least one image characteristic includes at least one of quality, shape, or material;

identifying a subset of images accessed from the stored images received from the subject consumer, wherein the subset of images each comprise the at least one image characteristic;

accessing a subset of the consumer data identified as being associated with the subset of images received from the subject consumer comprising the at least one image characteristic;

performing electronic image processing of the third party product images to determine at least one image characteristic of the third party product images, wherein the at least one image characteristic includes at least one of quality, shape, or material;

based on a regression curve fitting analysis, determining data-image correlations between at least one of the subject image, the images received from the subject consumer, or the third party images, wherein the regression curve fitting analysis utilizes at least one of the consumer data, the determined at least one image characteristic of the third party product images, the determined at least one image characteristic of the subject image, or the determined at least one image characteristic of the images received from the subject consumer, wherein proximity along the regression curve determines correlation weight;

store the data-image correlations based on strength of correlation determined by correlation weight;

applying the determined data-image correlations having a correlation strength over a predetermined threshold to identify particular consumer-relevant product images received from the third parties;

based on the data-image correlation, generating electronic instructions that automatically generate, in a consumer interface, the product recommendations for the subject consumer.

11. The computer-implemented method of claim 10, further comprising:

predictively adjusting consumer data associated with the subject consumer based on correlations of other consumer data and respective associated images, wherein the product recommendations are further generated based on the predictively adjusted consumer data.

12. The computer-implemented method of claim 10, further comprising:

determining position data associated with the subject image;

manipulating the subject image with at least one product image associated with at least one product recommendation, wherein the product image is incorporated into the subject image according to the determined position data; and causing provision of the manipulated subject image on a user computing entity.

13. The computer-implemented method of claim 10, further comprising:

via the consumer interface, enabling consumer directed manipulation of the subject image with at least one product image associated with at least one product recommendation.

14. The computer-implemented method of claim 10, further comprising:

generating a natural language query to solicit additional information regarding preferences of the subject consumer; and processing a received natural language response to generate consumer preferences, wherein the product recommendations are further based on the generated consumer preferences.

15. The computer-implemented method of claim 10, further comprising:

receiving and storing (d) interaction data describing consumer interactions with electronic advertisements; and processing the interaction data to determine a targeting advertisement for the subject consumer and the generated product recommendations.

16. The computer-implemented method of claim 10, wherein the subject image is received via an external consumer-facing third party system.

17. The computer-implemented method of claim 10, wherein the subject image is received via the consumer interface communicatively connected to the system via at least one network.

18. The computer-implemented method of claim 10, further comprising:

receiving and storing consumer data relating to the subject user's calendar.

19. One or more non-transitory computer-readable media having computer-executable instructions embodied thereon that, when executed, perform a method of processing a subject image, consumer data and product images to generate product recommendations, the method comprising:

receiving and storing within one or more memory storage areas of a system, (a) images received from a subject consumer, (b) the consumer data relating to at least one of consumer preferences, consumer purchase history, consumer browsing history, or consumer location, and (c)third party product images;

receiving the subject image associated with a subject consumer;

performing electronic image processing of the subject image to determine at least one image characteristic of the subject image wherein the at least one image characteristic includes at least one of quality, shape, or material;

identifying a subset of images accessed from the stored images received from the subject consumer, wherein the subset of images each comprise the at least one image characteristic;

accessing a subset of the consumer data identified as being associated with the subset of images received from the subject consumer comprising the at least one image characteristic;

perform electronic image processing of the third party product images to determine at least one image characteristic of the third party product images, wherein the at least one image characteristic includes at least one of quality, shape, or material;

based on a regression curve fitting analysis, determining data-image correlations between at least one of the subject image, the images received from the subject consumer, the third party images wherein the regression curve fitting analysis utilizes at least one of the consumer data, the determined at least one image characteristic of the third party product images, the determined at least one image characteristic of the subject image, or the determined at least one image characteristic of the images received from the subject consumer, wherein proximity along the regression curve determines correlation weight;

store the data-image correlations based on strength of correlation determined by correlation weight;

applying the determined data-image correlations having a correlation strength over a predetermined threshold to identify particular consumer-relevant product images received from the third parties;

based on applying the data-image correlations, generating electronic instructions that automatically generate, in a consumer interface, the product recommendations for the subject consumer.

20. The one or more non-transitory computer-readable media of claim 19, wherein the one or more non-transitory computer-readable media having further computer-executable instructions to perform the method of:

predictively adjusting consumer data associated with the subject consumer based on correlations of other consumer data and respective associated images, wherein the product recommendations are further generated based on the predictively adjusted consumer data.

21. The one or more non-transitory computer-readable media of claim 19, wherein the one or more non-transitory computer-readable media having further computer-executable instructions to perform the method of:

determining position data associated with the subject image;

manipulating the subject image with at least one product image associated with at least one product recommendation, wherein the product image is incorporated into the subject image according to the determined position data; and causing provision of the manipulated subject image on a user computing entity.

22. The one or more non-transitory computer-readable media of claim 19, wherein the one or more non-transitory computer-readable media having further computer-executable instructions to perform the method of:

via the consumer interface, enabling consumer directed manipulation of the subject image with at least one product image associated with at least one product recommendation.

23. The one or more non-transitory computer-readable media of claim 19, wherein the one or more non-transitory computer-readable media having further computer-executable instructions to perform the method of:

generating a natural language query to solicit additional information regarding preferences of the subject consumer; and processing a received natural language response to generate consumer preferences, wherein the product recommendations are further based on the generated consumer preferences.

* * * * *